United States Patent
Bernhardt et al.

(10) Patent No.: US 8,594,399 B2
(45) Date of Patent: Nov. 26, 2013

(54) METHOD FOR ACTUATING AN IMAGE OUTPUT DEVICE, METHOD FOR DETERMINING TANGENTIAL SLICE PLANES, ACTUATION MODULE AND SLICE PLANE DETERMINATION UNIT

(75) Inventors: Dominik Bernhardt, Karlsruhe (DE); Michael Scheuering, Nürnberg (DE); Johann Uebler, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 759 days.

(21) Appl. No.: 12/695,206

(22) Filed: Jan. 28, 2010

(65) Prior Publication Data

US 2010/0195879 A1   Aug. 5, 2010

(30) Foreign Application Priority Data

Jan. 30, 2009 (DE) .......................... 10 2009 006 765

(51) Int. Cl.
*G06K 9/00* (2006.01)
(52) U.S. Cl.
USPC ........................................................ 382/128
(58) Field of Classification Search
USPC .................................. 382/128, 132; 600/425
See application file for complete search history.

(56) References Cited

U.S. PATENT DOCUMENTS

| 6,643,533 | B2 | 11/2003 | Betting |
| 7,149,564 | B2 * | 12/2006 | Vining et al. ................. 600/425 |
| 7,369,691 | B2 * | 5/2008 | Kondo et al. ................. 382/128 |
| 2008/0232658 | A1 * | 9/2008 | Sugaya et al. ................. 382/128 |
| 2009/0087068 | A1 * | 4/2009 | Sakaguchi ..................... 382/132 |

FOREIGN PATENT DOCUMENTS

| EP | 0961993 B1 | 2/2005 |
| WO | WO 98/37517 | 8/1998 |

* cited by examiner

*Primary Examiner* — Gerald J. O'Connor
*Assistant Examiner* — Edward Winston, III
(74) *Attorney, Agent, or Firm* — Harness, Dickey & Pierce, P.L.C.

(57) ABSTRACT

A method is disclosed for actuating an image output device for the output of slice images, obtained from volume data, of a tissue region including at least one hollow organ section. In at least one embodiment, tangential slice planes at observation points along at least one profile line section through the hollow organ section are determined on the basis of provided volume data. In the process, the profile line section is decomposed into shorter profile line sections such that the generated profile line sections are each situated at least approximately in a plane assigned to the respective profile line section as per a predetermined quality criterion. First tangential slice planes are each assigned to the possible observation points on the associated profile line sections on the basis of these planes. A first tangential slice image is then generated from the volume data for a current observation point on the profile line section on the basis of a first tangential slice plane determined for this observation point. Control commands for the image output device are generated for the output of this slice image and transmitted to the image output device. Moreover, at least one embodiment of the invention relates to an actuation module suitable for this purpose.

15 Claims, 5 Drawing Sheets

METHOD FOR ACTUATING AN IMAGE OUTPUT DEVICE, METHOD FOR DETERMINING TANGENTIAL SLICE PLANES, ACTUATION MODULE AND SLICE PLANE DETERMINATION UNIT

PRIORITY STATEMENT

The present application hereby claims priority under 35 U.S.C. §119 on German patent application number DE 10 2009 006 765.5 filed Jan. 30, 2009, the entire contents of which are hereby incorporated herein by reference.

FIELD

At least one embodiment of the present invention generally relates to a method for actuating an image output device for the output of slice images, obtained from volume data, of a tissue region comprising at least one hollow organ section. Furthermore, at least one embodiment of the invention generally relates to a method for determining tangential slice planes at observation points along a profile line through a hollow organ section, which method can be used in the mentioned actuation method. Moreover, at least one embodiment of the invention generally relates to an actuation module for actuating an image output device and a slice plane determination unit operating according to the mentioned slice plane determination method. At least one embodiment of the invention also generally relates to an image processing device with such an actuation module.

BACKGROUND

In the field of medical technology, image output devices are used to display for a user volume data images, particularly slice images, derived from volume data of a target tissue region. By way of example, such volume data can be obtained with the aid of tomography devices, such as computed tomography scanners, magnetic resonance imaging scanners, or else other imaging devices such as ultrasound installations. There are different display modes for such volume data images obtained from volume data. For example, they show different slice or sectional perspectives of the imaged tissue region in different projections or display depths. These include the multiplanar reconstruction (MPR) and the maximum intensity projection (MIP). The multiplanar reconstruction is a sectional imaging method in which the hollow organ is placed into a plane in a virtual fashion and shown with depth resolution in a virtually three-dimensional fashion. By contrast, the maximum intensity projection is a sectional imaging method in which sections of a tissue region, situated one behind the other or one above the other, are illustrated in a two-dimensional fashion. In the process, superimposed structures are illustrated together and a contrast is formed where that part of the tissue volume which causes the greatest measurement intensity in the imaging measurement produces the highest degree of coloring in the projection illustration. Like a back projection onto a focusing screen, structures positioned behind one another can in this fashion be illustrated in a plane.

An important field of application which uses volume data images generated by the abovementioned imaging devices is the diagnosis of hollow organs or hollow organ sections, e.g. vessels, in particular coronary vessels on the heart or vessels in the brain, or other tubular hollow organs such as the colon or the bronchi. In particular, a problem in diagnosing such structures lies in the fact that lesions can usually be found in edges of the hollow structure or in the walls of the hollow organ. A typical example of such a lesion is a stenotic region in a vessel section.

These days, such hollow organ sections are usually diagnosed using a pre-calculated profile line through the hollow organ. In the following text, a "profile line" is a line which follows the profile of the observed hollow organ. This generally is a central line running right through the middle of the hollow organ, the so-called "centerline". The literature already discloses different relevant methods for pre-calculating such centerlines. Likewise, within the scope of computer aided diagnosis methods, there already are different methods for automatically selecting slice planes through the hollow organ such that possible lesions are illustrated in the view suitable for a post-evaluation. Thus, EP 0 961 993 B1 (=WO 98/37517) describes a method in which regions of an intestine with an abnormal wall thickness are automatically recognized as possible lesions and are then visualized in a particularly marked fashion in a wire model. In the process, slices are also generated along the profile line such that the lesions are clearly identifiable. U.S. Pat. No. 6,643,533 B2 suggests placing slice images along the profile plane through a blood vessel such that in a narrowing the smallest diameter of the blood vessel lies in the slice plane, i.e. the slice plane is selected such that the slice image shows the smallest lumen dimension. In the case of dilation, the slice image can be placed along the profile plane such that the largest diameter of the blood vessel is situated in the slice plane.

During the conventional diagnosis by an expert at an image output device, this centerline is used as a path for a virtual movement through the hollow organ section. Depending on the type of profile line or centerline calculation, this can consist of a number of individual points aligned next to one another, or else it can be constructed as a continuous line or a polygonal chain. During a virtual movement through the hollow organ along the centerline, different slice images can then be displayed on a diagnosis workstation at different observation points which can, for example, be the individual points from which the "centerline" is composed or, in the case of a continuous "centerline", points at a certain step-size and can be observed by the user.

A typical screen surface for such diagnosis is illustrated in FIG. 1. On the left-hand side there is an image display field BF in which four different illustrations of the hollow organ section HO of interest, in this case the right coronary artery, are illustrated. To the right thereof there is a parameter display bar PL, acting as a user interface, on which the observer can adjust certain parameters with the aid of mouse clicks. In this case, a three-dimensional volume image VR of the heart, in which the relevant coronary artery is clearly visible, is displayed at the bottom on the right-hand side of the image display field BF. To the left thereof an orthogonal slice OS is shown at a certain point on the "centerline" along the coronary artery (the "centerline" itself is not illustrated in this case). The two upper images show two tangential slice images $TS_1$, $TS_2$. The orthogonal slice plane and the tangential slice planes are selected such that they respectively are mutually perpendicular. Here, the orthogonal slice plane is situated perpendicular to the profile line at a given point on the profile line and the tangential slice planes correspond to longitudinal slices along the hollow organ section and can be tangent to the profile line at e.g. this point, or can comprise this point. When moving along the "centerline" from one observation point to the next, a new orthogonal slice, which is perpendicular to the "centerline" at the respective observation point, and the two tangential slice images $TS_1$, $TS_2$ perpendicular thereto are illustrated at all observation points. By moving forward and backward along the "centerline", for example by operating virtual pushbuttons on the parameter display bar with the aid of the mouse pointer, the complete hollow organ section can be successively observed within the scope of this profile display.

However, the problem with such a conventional procedure is that there are very big jumps in the tangential planes, particularly in the case of strongly curved structures and/or in the case of structures with frequent changes in curvature. When passing through the structure along the profile line, this leads to a bumpy, very vigorously "shaking" display of the tangential slice images. This harbors the risk of the observer easily losing the focus and the orientation in the image. This can lead to relevant structural changes being overlooked.

SUMMARY

In at least one embodiment of the invention, an improved actuation method is created and, for actuating an image output device, a corresponding actuation module which permits a shaking-optimized display or, in the ideal case, a display with as little shaking as possible during a profile illustration along a profile line through a hollow organ.

Accordingly, an actuation method according to at least one embodiment of the invention comprises at least the following:

The volume data and a profile line section through at least part of the hollow organ section have to be provided. In the process, the profile line section in the hollow organ or the hollow organ section can also be set within the scope of the method, possibly after a preceding identification and/or segmentation of the hollow organ or the hollow organ section. The profile line can also be successively determined in parallel while the method according to at least one embodiment of the invention is being performed. All that has to be available at any one time is a sufficiently long section in which the current observation points are situated and so the subsequently explained plane-based decomposition for finding the optimum tangential slice planes can be effected in a meaningful fashion.

Then tangential slice planes are determined at observation points along the profile line section through the hollow organ section, wherein the profile line section is decomposed into shorter profile line sections such that the generated individual profile line sections as per a predetermined quality criterion are each situated at least approximately in an auxiliary plane. In each case, first tangential slice planes are assigned to the possible observation points on the associated profile line sections on the basis of these auxiliary planes. Here, the tangential slice plane can correspond to the respective auxiliary plane, but it can also be slightly displaced parallel to the respective auxiliary plane so that, for example, the current observation point on the profile line itself is precisely situated in the slice plane assigned to the observation point.

The slice planes can be assigned directly or indirectly to the observation points. This means that, for example, the data required for defining the slice planes for each observation point can be directly stored in a list. By contrast, in the case of an indirect assignment, there first of all is for example a reference from the observation point to the associated profile line section. Then the definition data for the associated tangential slice planes is assigned to each profile line section because the tangential slice planes for all observation points belonging to this profile line section are equal. Possible orthogonal slice planes can then be identified or stored individually for the individual observation points, as will be explained in more detail below.

A first tangential slice image is then respectively generated from the volume data for a current observation point on a profile line section on the basis of a first tangential slice plane determined for this observation point. In the process, the current observation point can be prescribed by a user, e.g. during diagnosis, for example with the aid of the user interface explained above.

In order to output this current slice image to the user, the control commands for the image output device are respectively generated or derived from the data generated in the preceding steps.

These control commands are then transmitted to the image output device such that the relevant slice image can be output or displayed thereon.

Thus, a key point of the idea is a plane-based division of the observed profile line into individual segments such that each of these segments is at least approximately situated in a plane (referred to in this case as an auxiliary plane), wherein care is preferably taken that a minimum number of segments is required for the complete description of the overall profile line. Unlike the previous methods, it is thus no longer the case that a new tangential plane is determined independently at each individual observation point, based only on the local curve profile, and that the tangential slice image is generated from this and displayed. This leads to the number of jumps or fast directional changes of the tangential slice planes during a virtual movement along the profile line being markedly reduced. As a result of the plane-based division of the profile line, the latter can be run-through continuously with a minimum number of changes of view. Hence, the display is significantly more settled and this very much simplifies the orientation for the observer. The previously occurring shaking and jerking of the image display is avoided.

An actuation module according to at least one embodiment of the invention comprises at least the following components:

A volume data interface for acquiring volume data. Said interface can preferably also acquire an already previously determined profile line section through at least part of the hollow organ section, provided said section was generated outside of the actuation module.

An input interface for acquiring observation point data, e.g. the coordinates of a current observation point on the profile line. This can be an interface by means of which a user can prescribe the current observation point.

A slice plane determination unit for determining tangential slice planes at observation points along at least one profile line section through the hollow organ section which is designed such that, during the intended operation of the actuation module, it decomposes the profile line section into shorter profile line sections such that the generated individual profile line sections are each situated at least approximately in an auxiliary plane as per a predetermined quality criterion and first tangential slice planes are then each assigned to the possible observation points on the associated profile line sections on the basis of these auxiliary planes.

A slice image generation unit for generating a first tangential slice image from the volume data for a current observation point defined by the acquired observation point data on the profile line on the basis of a first tangential slice plane determined for this observation point.

A control command derivation unit for generating control commands for the image output device.

An output interface for transmitting the control commands to the image output device.

By way of example, the image output device can comprise a device driver, e.g. for a display monitor, and the control commands output by the actuation module via the output interface are such that the device driver is actuated in a suitable fashion. However, in principle, the actuation module itself can also contain a device driver for a display monitor or the like of the image output device, and so the control commands output by the actuation module via the output interface can directly actuate this monitor.

The interfaces do not necessarily have to be designed as hardware components but can also be implemented as software modules, for example if the volume data can be acquired from another component already implemented on the same equipment, e.g. from an image reconstruction apparatus, another image processing unit or the like, or if the control commands only have to be transferred in software terms to another component. Likewise, the interfaces can also comprise hardware and software components, for example a standard hardware interface which has been configured specifically by software for this particular use. Moreover, a plurality of interfaces can also be combined together in a combined interface, for example an input-output interface.

Overall, a majority of the components for implementing the device according to at least one embodiment of the invention can wholly or partly be implemented in the form of software modules on a processor, in particular the slice plane determination unit, the slice image generation unit and the control command derivation unit.

At least one embodiment of the present invention therefore also comprises a computer program product which can be loaded directly into storage of a programmable image processing device, with program code sections for executing all steps of an actuation method according to the invention when the program is executed in the image processing device. In the process, the image processing device can also be a component of the imaging system itself which is used to acquire the volume data.

Further particularly advantageous refinements and developments of at least one embodiment of the invention emerge from the dependent claims and the following description. In the process, the actuation module can also be developed in accordance with the dependent claims of the analogous actuation method.

There are various possibilities for a plane-based decomposition of the profile line such that each segment is situated at least approximately in a plane, i.e. for determining the auxiliary planes or the tangential slice planes based thereon. The determination of the tangential slice planes as per a method of at least one embodiment with at least the following method steps is particularly preferred:

a) First of all, one auxiliary plane including the two end points of the profile line section is identified, wherein a rotational angle of the auxiliary plane about a rotational axis running through the end points of the profile line section is selected with the aid of an optimization method such that a defined distance measure between the auxiliary plane and the profile line section (or the individual points of the profile line section) is minimized. Different possibilities for defining a suitable distance measure and different optimization methods will still be explained below. Depending on the distance measure and the optimization method, it is also feasible for there to be (only) an approximate minimization of the distance measure.

b) Then, a "maximum distance point" on the profile line section, which point has the greatest distance from the auxiliary plane, is determined.

c) This maximum distance point is analyzed as to whether the distance of the maximum distance point from the auxiliary plane is less than a predetermined threshold. If the distance of the maximum distance point from the auxiliary plane does not lie below the predetermined threshold, the profile line section at the maximum distance point is divided into two profile line sections. The two shorter profile line sections generated therein then respectively run between the maximum distance point (as a new end point) and one of the original end points of the now divided profile line section.

d) Method steps a) to c) are respectively recursively repeated with the newly generated profile line sections until the original profile line section is divided into individual shorter profile line sections, with an auxiliary plane being found for each profile line section, the distance of which plane from a maximum distance point of the respective profile line section lying below the predetermined threshold. The recursion can be completed for the profile line sections for which such an auxiliary plane which satisfies the distance criterion has already been found. By contrast, other profile line sections, for which the suitable auxiliary plane has not yet been found, are again divided at the maximum distance point and the recursion method is continued using the even shorter profile line sections generated in the process.

e) Finally, first tangential slice planes are assigned to the observation points situated on the respectively associated profile line sections on the basis of the obtained auxiliary planes, as already explained above, wherein this step can also be successively performed during the recursive method for all auxiliary planes or the associated profile line sections for which the distance criterion has already been satisfied.

Such a method can quickly and reliably achieve a decomposition of the profile line section to be observed and so, on the one hand, the original profile line section is only divided into a minimum number of shorter profile line sections and, nevertheless, each of these profile line sections is situated as well as possible in a plane.

In addition to being used in the method according to at least one embodiment of the invention, such a method for determining tangential slice image generation planes at different observation points along a profile line through a hollow organ section in the volume data of a tissue region comprising the hollow organ section can also be utilized in similar methods. By way of example, this method can be used in a meaningful fashion where slice images of a hollow organ are intended to be printed out onto paper or foil for an observation on conventional fluorescent screens, to the extent that it is desirable for slice planes which are as comparable as possible to be available at subsequent observation points along a profile line for comparing slice image printouts. To this end, provision only has to be made for at least one profile line section of the hollow organ section with a first and a second end point, and the abovementioned method for determining the tangential slice planes can then be performed. The determined tangential slice planes or the parameters describing the slice planes can then be output e.g. as a result to a device for generating the slice images for the printer or the filming station. Such a profile line section can be generated within the scope of the method itself. However, acquisition of an already previously determined profile line section or a complete profile line is also possible.

In order to carry out such a slice plane determination method, the actuation module requires a slice plane determination unit with at least the following components:

an interface for providing at least one profile line section of the hollow organ section with a first and a second end point.

An auxiliary plane determination unit which is designed such that it carries out the following method steps when used as intended:
i) identifying one auxiliary plane including the end points of the profile line section, wherein a rotational angle of the auxiliary plane about a rotational axis running through the end points of the profile line section is selected using an optimization method such that a defined distance measure between the auxiliary plane and the profile line section is at least approximately minimized,
ii) determining a maximum distance point on the profile line section, which point has the greatest distance from the auxiliary plane,
iii) analyzing whether the distance of the maximum distance point from the auxiliary plane is less than a predetermined threshold, and dividing the profile line section into two profile line sections at the maximum distance point if the distance of the maximum distance point from the auxiliary plane does not lie below the predetermined threshold, and
iv) recursive continuing of method steps i) to iii) with the profile line sections until an auxiliary plane is found for every profile line section, the distance of which plane from a maximum distance point of the respective profile line section lies below the predetermined threshold.

A slice plane assignment unit for assigning first tangential slice planes with observation points situated on the respectively associated profile line sections, respectively on the basis of the obtained auxiliary planes.

In at least one embodiment of the abovementioned method, precisely that plane is respectively selected (as an auxiliary plane) from a cluster of planes passing through the start point and the end point of the currently observed profile line section in which the given distance measure is minimal. Such a cluster of planes can be described in the Hesse normal form using the equation:

$$(n_1 \cdot x + p_1) + \lambda (n_2 \cdot x + p_2) = 0. \tag{1}$$

Herein, x is an arbitrary position vector on the respective plane of the cluster of planes in a freely chosen coordinate system with an arbitrarily fixed origin; $n_1$, $n_2$ are two arbitrary unit vectors orthogonal to the connecting line between the start point and the end point of the observed profile line section; $p_1$, $p_2$ respectively correspond to the distance between the origin of the coordinate system and the planes defined by the unit vectors $n_1$, $n_2$ which are orthonormal to these unit vectors; and $\lambda$ is a free parameter of the cluster of planes by means of which the rotational angle around the axis running through the start point and the end point of the observed profile line section can be identified.

As already mentioned above, there are different possibilities for defining the distance measure.

In at least one variant embodiment, the distance measure between the auxiliary plane and the profile line section is determined by a combination of the Euclidean distances of points on the profile line distance from the auxiliary plane. In a particularly preferred fashion, the Euclidean distances of points on the profile line section from the auxiliary plane can be added together in order to determine the distance measure between the auxiliary plane and the profile line distance.

The Euclidean distance d of an arbitrary point $x_0$ from a plane in the Hesse normal form can be described as follows:

$$d(\vec{x}_0) = \vec{n} \cdot \vec{x}_0 + p. \tag{2}$$

Herein p is the distance of the plane from the origin of the freely selected coordinate system. With the aid of this equation, the accumulated distance of all points on the observed profile line section for each plane of the cluster of planes can be determined as follows:

$$\sum_{i=0}^{m} (\vec{n} \cdot \vec{x}_i + p), \tag{3}$$

wherein m is the number of points on the observed profile line section. In the case of a profile line prescribed in a discrete fashion from individual points, this simply is the number of points on the relevant profile line section. In the case of a continuously prescribed profile line, for example a parameterized curve, m can be given by the length of the observed profile line section divided by a predetermined step-size by means of which a user can step forward or back along the profile line during the observation.

Thus, in order to eliminate the free parameter $\lambda$ of the cluster of planes from the above equation (1) within the scope of at least one embodiment of the optimization method, it follows that the accumulated distance for each plane of the cluster of planes, i.e. the sum of the distances of the points of the profile line section, can be determined as per equation (3) and that plane can then be selected which has the smallest accumulated distance.

In a particularly simple optimization method of at least one embodiment, such a calculation is performed for a discrete number of planes, which respectively differ from one another in respect of the rotational angle $\lambda$ by a certain step-size. By way of example, the angle $\lambda$ can be varied in 1° steps and the distance measure can in each case be calculated for the plane that is generated. Using currently available computers, it goes without saying that such a calculation can be performed in real time.

Alternatively, it is also possible for other optimization methods to be used, such as, for example, gradient methods (also referred to "methods of steepest descent") or so-called hill climbing or downhill search methods, in particular the downhill simplex method.

In addition to adding together the individual Euclidean distances of the points to the respective profile line section, it is also possible for other combinations of the distances, for example the sum of the squares or the like, to be used.

An alternative, very simple distance measure is based on the use of a Euclidean distance between a centroid of the profile line section and the respective auxiliary plane. The centroid of a profile line section emerges as the arithmetic mean of all points on this profile line section:

$$\frac{1}{m} \sum_{i=0}^{m} \vec{x}_i, \tag{4}$$

where m again is the number of points on the observed profile line section.

Provided that a profile line section which is now intended to be associated with a matching slice plane is approximately a straight-line segment after decomposition, a multiplicity of planes can emerge for which the optimization criterion is satisfied; in the extreme case of an exactly straight-line segment this can even be an infinite number of planes. Therefore, the rotational angle of an auxiliary plane, which belongs to a basically (i.e. approximately) straight profile line section, is selected taking into account the orientation of the auxiliary planes of adjacent profile line segments. In a particularly preferred fashion, the mean value of the rotational angle of the auxiliary planes of the adjacent profile line section is then used as the rotational angle of this auxiliary plane, since in this fashion a transition which is as smooth as possible is ensured between the planes or slice images belonging to the individual adjacent profile line sections.

As already mentioned initially, at an observation point, a slice image orthogonal to the profile line at the respective observation point is also particularly preferably generated from the volume data in addition to the first tangential slice image, and corresponding control commands for the image output device are derived for the output of this orthogonal slice image and transmitted to the image output device. In a corresponding fashion, a second tangential slice image rotated by 90° with respect to the first tangential slice image is preferably also generated from the volume data in addition to the first tangential slice image, and corresponding control commands for the image output device are derived for the output of this second tangential slice image and transmitted to the image output device. That is to say that in a preferred embodiment of the method according to at least one embodiment of the invention, one orthogonal slice plane and two tangential slice planes are therefore determined along a profile line section for each of the possible observation points of the profile line section, and corresponding stacks of slice images are assembled which are then successively called one after the other during a later observation when the individual observation points are approached in a virtual fashion.

It is possible for very diverse slice images to be generated in the process, preferably the above-mentioned multiplanar reconstructions (MPR images) or maximum intensity projections (MIP images). In principle, it is also possible for different slice images to be generated for each point and the user then selectively selects one or the other illustration or a combination of these illustrations—for example one illustration variant in the first tangential slice plane and a different illustration variant in a different slice image plane.

In principle, the invention can be applied in any type of, in particular tubular, hollow organs. The method can be applied particularly gainfully in the field of imaging brain supply structures, for example the Carotid artery, or in imaging coronary arteries.

A particular advantage emerges if such volume data, which represents regions which exist outside of the direct functional relationship with the hollow organ, is eliminated computationally from the volume image for the image display of the volume image. Such segmentation within the volume data, which is intended to address only the use of the important volume data regions for the illustration of the hollow organ, in particular excludes the possibility of bothersome structures such as bone structures in the surrounding area making the illustration more difficult for the user, as a result of which errors in the recognition can be avoided during the search for conspicuous structures.

In principle, the actuation method according to at least one embodiment of the invention can be performed in a fully-automated fashion, for example with the aid of recognition programs for automatically recognizing certain hollow organs, as are offered by the Vital Images company, and which also generate the profile lines of hollow organs automatically. However, it is preferable for the profile line to be output to a user for the purposes of modification. Within the scope of such a semi-automatic process, the actuation module thus obtains modification information via an interface. In principle, this modification information can also originate from input sources other than human input sources, for example from external data processing units.

BRIEF DESCRIPTION OF THE DRAWINGS

In the following text, the invention will once again be explained with reference to the attached figures and on the basis of example embodiments. In the process, the same components in the various figures are in part provided with identical reference figures. In particular.

DETAILED DESCRIPTION OF THE EXAMPLE EMBODIMENTS

Figure 1:
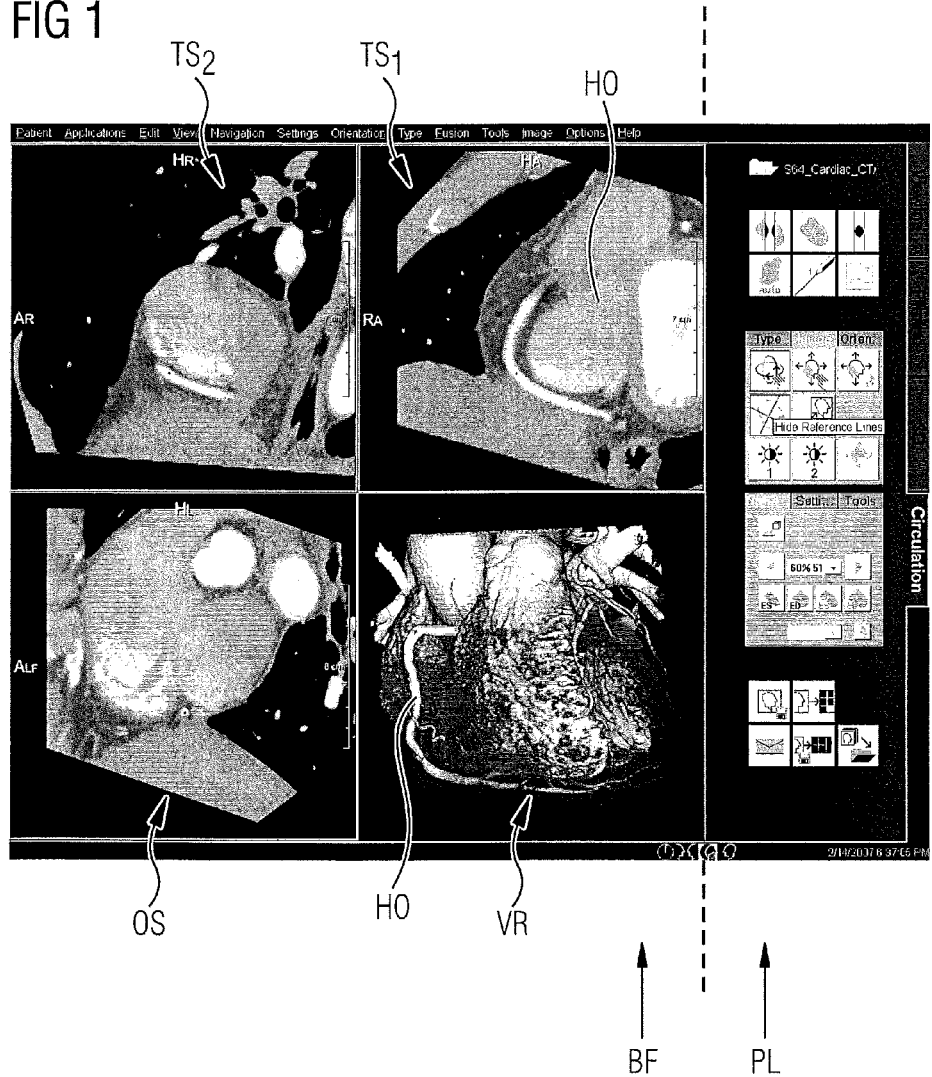
FIG. 1 shows an illustration of the user interface of a diagnosis workstation as per the prior art when observing a right coronary artery with three mutually orthogonal slice images being illustrated simultaneously.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

As mentioned initially, FIG. 1 shows, at the top and in the left-hand lower half of the image in the image display field BF, two tangential slice images $TS_1$, $TS_2$ and an orthogonal slice image OS at an observation point on a profile line through the right coronary artery. These respectively are multiplanar reconstructions. The right-hand lower half of the image shows a three-dimensional volume image VR of the heart with the right coronary artery on the basis of the volume rendering technique. This form of illustration shows the currently conventional industry standard for illustrating volume data or slice images for a user. In the process, the multiplanar reconstructions show slices in three mutually perpendicular planes of the same tissue region within the heart which is shown in the three-dimensional volume image VR. In each of the individual slice images $TS_1$, $TS_2$, OS, two reference axes situated perpendicularly with respect to one another are usually shown (not visible in the illustration shown here) and they represent the observation planes of the respective other two slice images. Such slice images have already been stored for every observation point on the profile line through the coronary artery, or they can be generated accordingly. The observer can run along the profile line from observation point to observation point by appropriate control commands and "scroll" through the slice image stack in the process.

Figure 2:
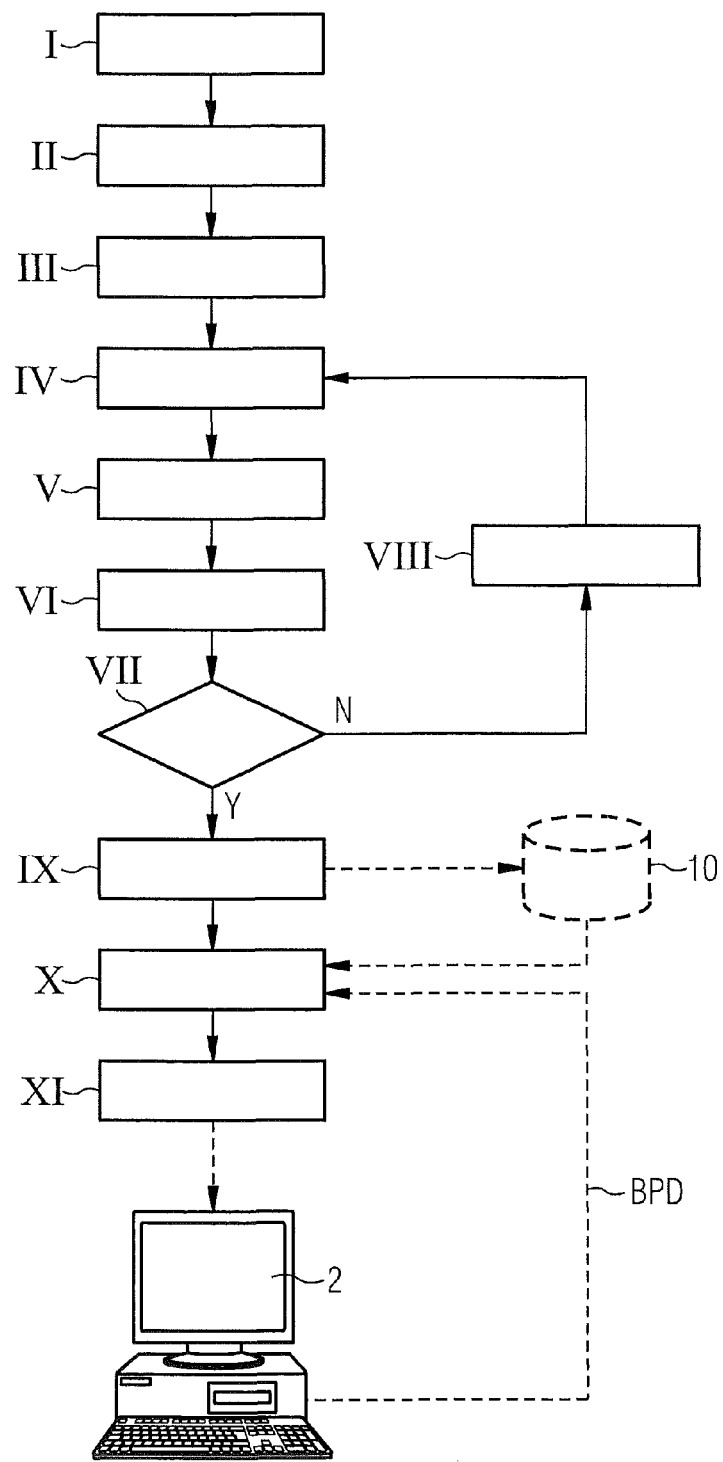
FIG. 2 shows a flowchart of a possible procedure of a method according to an embodiment of the invention.

FIG. 2 illustrates how the method according to an embodiment of the invention can ensure that, in the case of such an observation run-through along a profile line, the tangential slice images $TS_1$, $TS_2$ no longer shake as frequently and as vigorously as in the conventional display methods and so an observation run-through with a smoother display is possible for the observer.

In method step I, the method first of all starts with the provision of volume data of the region of interest—in this case, for example, the heart with the coronary artery to be observed. In method step II, the hollow organ is then identified in the volume data, wherein segmentation in particular is also possible. Within the scope of an embodiment of the method, this method step II is optional because it is also possible that, for example, only the volume data of the relevant hollow organ is already provided in step I, for example if identification and segmentation was performed previously within the scope of other methods.

At least one profile line piece through the hollow organ section to be observed is then determined in step III. In the process, this is usually the "centerline". Therefore, without loss of generality, the term "centerline" is used to mean the same as "profile line" in the following text. This step III is also optional within the scope of the method because it is also possible for the centerline to be prepared in advance together with the volume data.

The actual recursive method for decomposing the observed centerline section into the centerline segments then begins in step IV. Herein, a straight line is firstly placed through the end points of the centerline section, which are of course known from step III (or a previous recursion step), and an auxiliary plane including the end points is defined and can be rotated by a rotational angle λ about the straight line as axis of rotation.

In step V, the rotational angle λ is then optimized such that, in the fashion according to an embodiment of the invention, a defined distance measure between the auxiliary plane and the observed centerline section is minimized. By way of example, the distance of all centerline points on the observed centerline section from the auxiliary plane, accumulated according to equation (3), can be calculated for this, and, in the process, there can be an optimization of this distance as a function of the rotational angle λ with the aid of a gradient descent method.

The point referred to as the maximum distance point of the optimum auxiliary plane found in this fashion is then determined on the observed centerline section in step VI, which point has the greatest distance from the optimized auxiliary plane. Equation (2) can be used for this.

Step VII analyzes whether the distance DM of the maximum distance point from the optimized auxiliary plane, determined in step VI, lies below a certain distance threshold DG. If this is not the case, the path referred to by "N" is chosen in FIG. 2 and the recursive loop over method steps IV, V, VI, VII is continued being run through. In the process, the current profile line section is, in step VIII, first of all divided into two shorter centerline segments at the maximum point. For all centerline segments generated in this fashion, steps IV, V, VI and VII are then performed again.

In the process, the query in step VII is performed separately for each of the generated segments. Steps VIII, IV, V, VI and VII of the recursion method are run through again for those segments which do not yet satisfy the condition as per step VII. By contrast, the auxiliary plane corresponding to those centerline segments which satisfy the condition is already stored in a storage 10 in step IX, or the data required to define this auxiliary plane is stored (path "Y"). However, the next step X is generally only performed when step VII determines that the criterion is satisfied for all auxiliary planes, i.e. that the complete original centerline section was decomposed such that corresponding auxiliary planes which satisfy the distance criterion were found for all currently existing centerline sections and the auxiliary planes or the data thereof were/was stored in the storage 10 in step IX, even for the last centerline sections.

The entire method from step I to step IX can also be performed before actually observing the data, that is to say in a fully automatic fashion when for example calling an observation or diagnosis program, without interactive user interventions.

The observation point data BPD which defines a current observation point on the centerline is then acquired in step X. This can for example be performed by the input of an observer at a terminal of an image processing device 1 with a corresponding user interface, for example a keyboard or a graphical user interface.

Then corresponding slice images are generated in step X in the slice image planes predetermined for this observation point, wherein use can in turn be made of the slice image planes which are stored in the storage 10 and assigned to the individual observation points.

Reference is made to the fact that not only the slice images can be stored in the storage 10 in step IX, but that in principle a matching slice image can be generated here for every slice plane and the completed slice images can be stored in the storage 10. Then, all that is required in step X is that these slice images are called.

Finally, the control commands are generated in step XI in order to output the generated slice images, for example in the form illustrated in FIG. 1, on a monitor of the terminal 2, which in this case serves as a display device.

Figure 3:
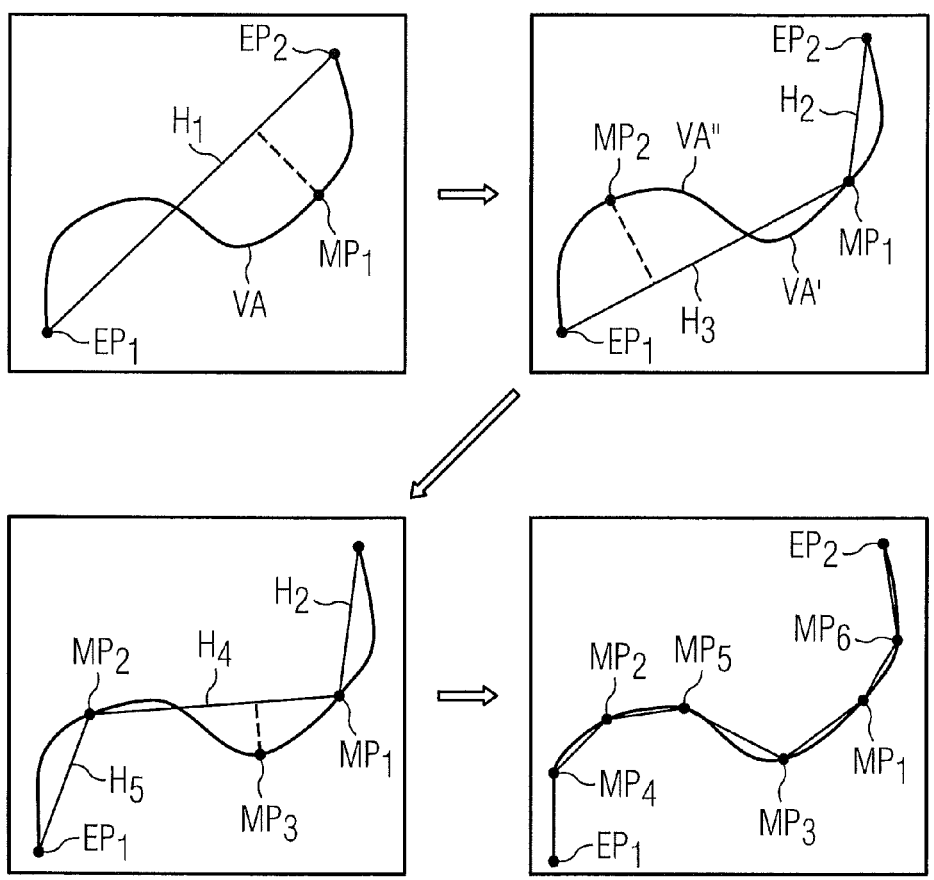
FIG. 3 shows a two-dimensional, very much simplified illustration of the principle of recursive decomposition of a profile line.

In order to clarify the method, FIG. 3 illustrates the cursive decomposition of a centerline section VA between two end points $EP_1$ and $EP_2$ in a very simplified fashion (in an initial step, two intermediate steps and a final step in accordance with the arrows between the individual images). Herein, it should be noted that only a two-dimensional illustration was selected for reasons of simplicity and so the essential part of the optimization of the angle $\lambda$ of the auxiliary plane $H_1$ about an axis running through the end points $EP_1$, $EP_2$ is not illustrated. To this end, reference is made to FIG. 4, which will still be explained below. However, in FIG. 3 it is clearly visible how respectively one maximum distance point $MP_1$, $MP_2$, ... on the currently observed centerline section from the auxiliary plane is determined and how the currently observed centerline section is divided into two shorter centerline sections at this maximum distance point $MP_1$, $MP_2$, ....

Therefore, the maximum distance point $MP_1$ is first of all determined in the first step, and this is then followed in the next step by a decomposition into two centerline sections VA', VA" with two own, new auxiliary planes $H_2$, $H_3$, wherein the maximum distance point $MP_2$ from the associated auxiliary plane $H_3$ is found simultaneously for the centerline section VA". In the next step, this centerline section VA" is then decomposed at the new maximum distance point $MP_2$ into two in turn shorter centerline sections which are now assigned the auxiliary planes $H_4$ and $H_5$. At the same time, it can be seen for the middle centerline section with the auxiliary plane $H_4$ how a new maximum distance point $MP_3$ is determined for this. What is then illustrated in the final step of FIG. 3 is how the overall centerline section VA was divided into many shorter centerline sections which respectively run from one maximum distance point $MP_1$, $MP_2$, $MP_3$, $MP_4$, $MP_5$, $MP_6$ (determined in a preceding recursion step) to the next, wherein the individual small centerline sections in each case already can be approximated relatively well to the individual auxiliary planes.

Figure 4:
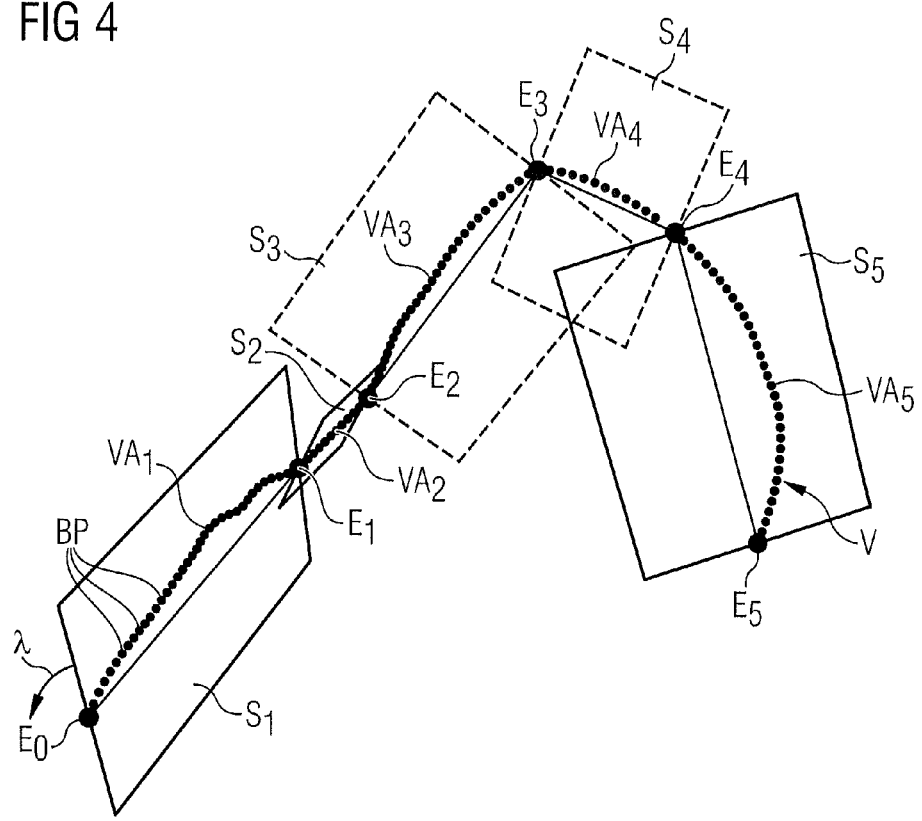
FIG. 4 shows a three-dimensional illustration of a profile line decomposed into individual profile line sections with the respectively associated tangential slice planes.

For this, FIG. 4 shows a perspective three-dimensional illustration of a completely decomposed profile line V. In this context, the profile line V is decomposed into a total of five profile line sections $VA_1$, $VA_2$, $VA_3$, $VA_4$, $VA_5$ which respectively extend between two end points $E_0$, $E_1$, $E_2$, $E_3$, $E_4$, $E_5$. A slice plane $S_1$, $S_2$, $S_3$, $S_4$, $S_5$ assigned to the respective centerline section $VA_1$, $VA_2$, $VA_3$, $VA_4$, $VA_5$ is sketched between the end points $E_0$, $E_1$, $E_2$, $E_3$, $E_4$, $E_5$ of each centerline section $VA_1$, $VA_2$, $VA_3$, $VA_4$, $VA_5$, which slice plane includes the respectively associated end points $E_0$, $E_1$, $E_2$, $E_3$, $E_4$, $E_5$ of the relevant centerline section $VA_1$, $VA_2$, $VA_3$, $VA_4$, $VA_5$, and the rotational angle $\lambda$ of which slice plane about an axis running through the respective end points $E_0$, $E_1$, $E_2$, $E_3$, $E_4$, $E_5$ is selected such that the respective centerline section $VA_1$, $VA_2$, $VA_3$, $VA_4$, $VA_5$ is approximately situated as well as possible in the respective slice plane $S_1$, $S_2$, $S_3$, $S_4$, $S_5$.

FIG. 4 also shows that the profile line V consists of individual observation points BP. The method according to an embodiment of the invention now ensures that, in the case of navigation from one observation point BP to the next observation point BP, the assigned tangential slice plane $S_1$, $S_2$, $S_3$, $S_4$, $S_5$ does not change in the vast majority of cases and so a smoother image display is possible during a running-through observation of the hollow organ. The slice planes $S_1$, $S_2$, $S_3$, $S_4$, $S_5$ are only switched at the end points $E_1$, $E_2$, $E_3$, $E_4$ and so a jump in the illustration of the tangential slice images can, if at all, only be expected here.

Figure 5:
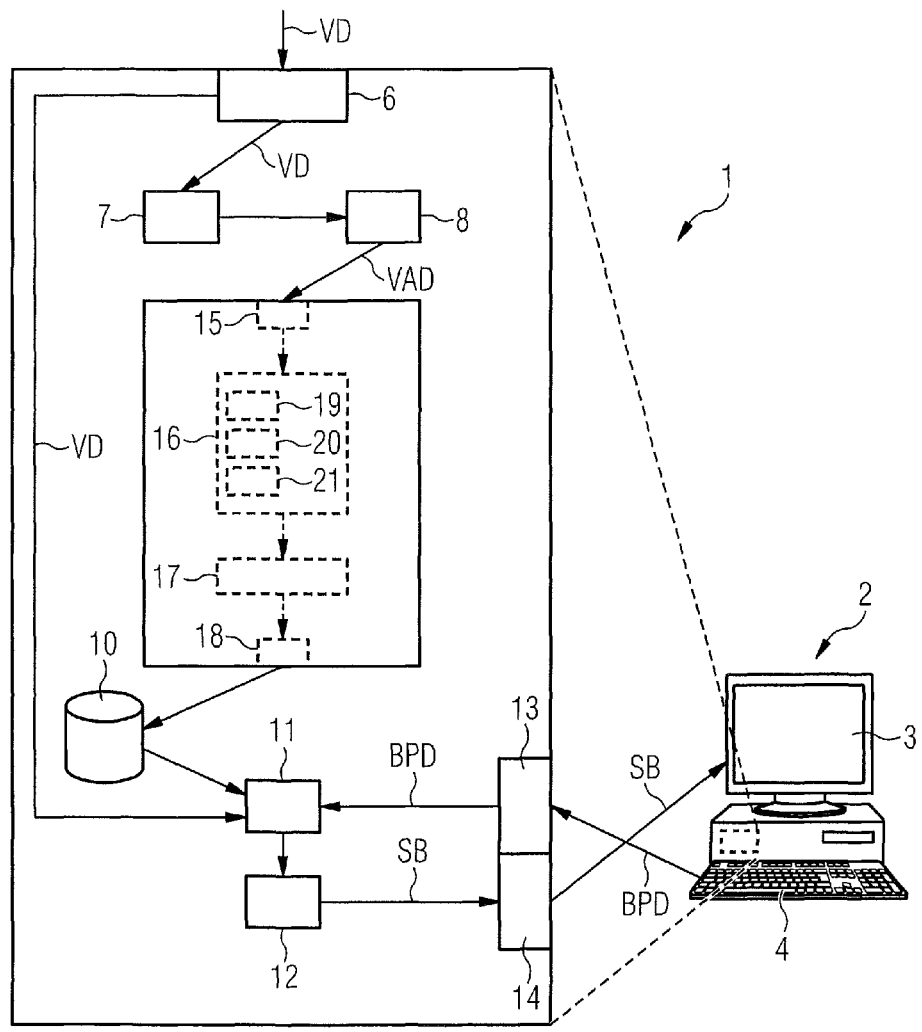
FIG. 5 shows a simplified block illustration of a possible embodiment of an actuation module according to the invention.

FIG. 5 shows an example of an image processing device 1 according to an embodiment of the invention with an actuation module 5 according to the invention and an image output device 3. The image output device 3 is the monitor 3 of a terminal 2 which is conventionally used for the diagnosis and is also equipped with a user interface 4, for example in the form of a keyboard and/or a mouse (not illustrated) in this case, which interacts with a graphical user interface on the monitor 3. The actuation module 5 can be implemented in the form of a hardware and software combination on a processor of this terminal 2; this is indicated in FIG. 5 by the dashed line.

Here, the actuation module 5 has a volume data interface 6 in order to acquire volume data VD comprising the desired hollow organ 1. This volume data VD is then for example transferred to a hollow organ determination unit 7 in order to identify and possibly segment the hollow organ in the volume data. A profile line determination unit 8 then identifies a profile line, for example the centerline, through the hollow organ and corresponding profile line section data VAD defining the identified centerline section is transmitted to a slice plane determination unit 9 according to an embodiment of the invention. It should also be noted in this case that the hollow organ determination unit 7 and the profile line identification unit 8 are optional and this data can also be acquired together with the volume data by means of the interface 6.

The profile line section data VAD defining the centerline section is acquired from an interface 15 in the slice plane determination module 9, wherein this interface generally is a virtual program interface 15 which acquires this data directly from the interface 6 or the profile line identification unit 8. The data is then fed to an auxiliary plane determination unit 16 which determines the auxiliary planes as described above. Components of this auxiliary plane determination unit 16 implemented purely in the form of software can for example be an optimization unit 19, for respectively determining one auxiliary plane with an optimum rotational angle between the end points of the profile line sections, and a maximum distance point determination unit 20, which determines the maximum distance point and the distance thereof from the optimized auxiliary plane. An analyzing unit 21 can be a further component and it analyzes whether the distance of the maximum distance point from the auxiliary plane lies below the predetermined threshold. These components 19, 20, 21 are designed such that the recursive method is performed according to an embodiment of the invention and thus a centerline section acquired from the interface 15 was decomposed into the required shorter centerline sections. Then a slice plane assignment unit 17 is used to directly or indirectly assign the obtained auxiliary planes with the respective observation points on the individual centerline sections as tangential slice planes. In this case, it should be noted that the slice plane assignment unit 17 and the auxiliary plane determination unit 16 can also be formed as a combined unit.

The respectively found tangential slice planes for the individual observation points are then stored in a storage 10 via a further interface 18, as was described above.

The actuation module 5 also has a slice image generation unit 11. This slice image generation unit 11 receives observation point data BPD, that is to say the coordinates of the current observation point on the centerline, from the terminal 2 via, for example, an interface 13 and it respectively generates for this point, on the basis of the tangential slice planes assigned to the individual observation points BP, one orthogonal slice image and two mutually perpendicular tangential slice images using the volume data VD which can be acquired from the interface 6.

The image data preferred in this case is then transferred to a control command derivation unit 12 of the actuation module 5; said unit generates the control commands for the image output device 3 and transmits these control commands SB to the terminal 2 or the monitor 3 thereof via an output interface 14. As a result of this, the driver of the monitor 3 is for example actuated such that the slice images are suitably displayed on the monitor 3, for example in the form illustrated in FIG. 1.

Finally, reference is once again made to the fact that the method described in detail above and the illustrated apparatuses are merely example embodiments which can be modified in a wide variety of ways by a person skilled in the art without departing from the scope of the invention. Furthermore, the use of the indefinite article "a" or "an" does not preclude the relevant features from also being present in plural form. Likewise, the terms "unit" and "module" do not preclude the relevant components from consisting of a plurality of interacting sub-components, which can possibly also be distributed in space.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combineable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, computer readable medium and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable medium and is adapted to perform any one of the aforementioned methods when run on a computer device (a device including a processor). Thus, the storage medium or computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for actuating an image output device for outputting of slice images, obtained from volume data, of a tissue region comprising at least one hollow organ section, comprising:
providing, by an actuation module, the volume data and a profile line section through at least part of the hollow organ section;
determining, by the actuation module, tangential slice planes at observation points along at least one profile line section through the hollow organ section, wherein the at least one profile line section is divided into relatively shorter profile line sections such that the relatively shorter profile line sections are each situated at least approximately in an auxiliary plane assigned to the respective at least one profile line section as per a quality criterion, and wherein first tangential slice planes are each assigned to possible observation points on the associated relatively shorter profile line sections based on the auxiliary planes;
generating, by the actuating module, at least one first tangential slice image from the volume data for each respective observation point on the profile line section based on a first tangential slice plane determined for the respective observation point;
generating, by the actuating module, control commands for the image output device for the output of the generated at least one first tangential slice image; and
transmitting the control commands, by the actuating module, to the image output device.

2. The method as claimed in claim 1, wherein the tangential slice planes at observation points along the profile line section are determined based on at least one of
identifying one auxiliary plane including two end points of the profile line section, wherein a rotational angle of the auxiliary plane about a rotational axis running through the end points of the profile line section is selected using an optimization method such that a defined distance measure between the auxiliary plane and the profile line section is minimized,
determining a maximum distance point, on the profile line section, which has a relatively greatest distance from the auxiliary plane,
analyzing whether the distance of the maximum distance point from the auxiliary plane is less than a threshold, and dividing the profile line section into two profile line sections at the maximum distance point upon the distance of the maximum distance point from the auxiliary plane not lying below the threshold,
recursive continuing of the identifying one auxiliary plane, the determining the maximum distance point and the analyzing with the profile line sections until an auxiliary plane is found for each of the relatively shorter profile line sections generated in the process, the distance of which plane from a maximum distance point of the respective relatively shorter profile line section lying below the threshold, and
respectively assigning first tangential slice plane to observation points situated on the respectively associated relatively shorter profile line sections based on the obtained auxiliary planes.

3. The method as claimed in claim 2, wherein the distance measure between the auxiliary plane and the profile line section is determined by combining the distances of points on the profile line section from the auxiliary plane.

4. The method as claimed in claim 3, wherein the distances of points on the profile line section from the auxiliary plane are added together in order to determine the distance measure between the auxiliary plane and the profile line section.

5. The method as claimed in claim 2, wherein the distance measure is determined based on a distance of a centroid of the profile line section from the auxiliary plane.

6. The method as claimed in claim 2, wherein the rotational angle of an auxiliary plane which is associated with a basically straight profile line section is selected based on an orientation of the auxiliary planes of adjacent profile line sections.

7. The method as claimed in claim 6, wherein the rotational angle of an auxiliary plane which is associated with a basically straight profile line section corresponds to a mean value of the rotational angles of the auxiliary planes of the adjacent profile line sections.

8. The method as claimed in claim 1, further comprising:
generating, in addition to the first tangential slice image from the volume data, at least one of a slice image orthogonal to the profile line at the respective observation point and a second tangential slice image rotated by 90° with respect to the first tangential slice image,
deriving corresponding control commands for the image output device for the output of at least one of the orthogonal slice image and the second tangential slice image, and
transmitting the derived commands to the image output device.

9. The method as claimed in claim 1, wherein the slice image comprises a multi-planar reconstruction or a maximum intensity projection.

10. A method for determining tangential slice planes at observation points along a profile line through a hollow organ section in volume data of a tissue region including at least the hollow organ section, comprising:
providing, by a actuating module, at least one profile line section of the hollow organ section with a first and second end point;
identifying, by the actuating module, one auxiliary plane including the end points of the at least one profile line section, wherein a rotational angle of the auxiliary plane about a rotational axis running through the end points of the at least one profile line section is selected using an optimization method such that a defined distance measure between the auxiliary plane and the at least one profile line section is minimized;
determining, by the actuating module, a maximum distance point on the at least one profile line section, the determined maximum distance point having a relatively greatest distance from the auxiliary plane;
analyzing, by the actuating module, whether a distance of the maximum distance point from the auxiliary plane is less than a threshold, and dividing the at least one profile line section into two profile line sections at the maximum distance point upon the distance of the maximum distance point from the auxiliary plane not lying below the threshold;
recursive continuing, by the actuating module, of the identifying, the determining and the analyzing with the two profile line sections until an auxiliary plane is found for each at least one profile line section, the distance of the auxiliary plane from a maximum distance point of a respective at least one profile line section lying below the threshold; and respectively assigning, by the actuating module, first tangential slice planes to observation points situated on the respectively associated at least one profile line section based on the obtained auxiliary planes.

11. An actuation module for actuating an image output device for outputting of slice images, obtained from volume data, of a tissue region comprising at least one hollow organ section, the actuation module comprising:

a volume data interface configured to acquire volume data;

an input interface configured to acquire observation point data;

a slice plane determination unit configured to determine tangential slice planes at observation points along at least one profile line section through the at least one hollow organ section which is designed such that the at least one profile line section is divided into relatively shorter profile line sections such that the relatively shorter profile line sections are each situated at least approximately in an auxiliary plane assigned to a respective relatively shorter profile line section as per a quality criterion and first tangential slice planes are each assigned to the possible observation points on the associated relatively shorter profile line sections based on the auxiliary planes;

a slice image generation unit configured to generate a first tangential slice image from the volume data for a current observation point on the at least one profile line based on a first tangential slice plane determined for the current observation point;

a control command derivation unit to generate control commands for the image output device; and an output interface configured to transmit the control commands to the image output device.

12. A slice plane determination unit for determining tangential slice planes at observation points along a profile line through a hollow organ section in volume data of a tissue region comprising at least the hollow organ section, comprising:

an interface configured to provide at least one profile line section of the hollow organ section with a first and a second end point;

an auxiliary plane determination unit configured to:
identify one auxiliary plane including end points of the at least one profile line section, wherein a rotational angle of the auxiliary plane about a rotational axis running through the end points of the at least one profile line section is selected using an optimization method such that a distance measure between the auxiliary plane and the at least one profile line section is at least approximately minimized, determine a maximum distance point on the at least one profile line section, the maximum distance point having a relatively greatest distance from the auxiliary plane, analyze whether a distance of the maximum distance point from the auxiliary plane is less than a threshold, and divide the at least one profile line section into at least two profile line sections at the maximum distance point upon the distance of the maximum distance point from the auxiliary plane not lying below the threshold, and recursively continue identifying one auxiliary plane, determining a maximum distance point and analyze whether a distance of the maximum distance point from the auxiliary plane is less than a threshold with the at least two profile line sections until an auxiliary plane is found for each of the at least two profile line sections, the distance of which plane from a maximum distance point of a respective profile line section lies below the threshold; and a slice plane assignment unit configured to assign first tangential slice planes with observation points situated on the respectively associated profile line sections, respectively based on the obtained auxiliary planes.

13. An image processing device comprising:
an image output device; and
an actuation module as claimed in claim 11 configured to actuate the image output device.

14. A computer readable medium including a computer program product, the computer program product comprising instructions, which when executed on a computer device, causes the computer device to perform functions for outputting of slice images, obtained from volume data, of a tissue region comprising at least one hollow organ section, the functions including:

providing the volume data and a profile line section through at least part of the hollow organ section;

determining tangential slice planes at observation points along at least one profile line section through the hollow organ section, wherein the at least one profile line section is divided into relatively shorter profile line sections such that the relatively shorter profile line sections are each situated at least approximately in an auxiliary plane assigned to the respective at least one profile line section based on a quality criterion, and wherein first tangential slice planes are each assigned to possible observation points on the associated relatively shorter profile line sections based on the auxiliary planes generating at least one first tangential slice image from the volume data for each respective observation point on the profile line section based on a first tangential slice plane determined for the respective observation point;

generating control commands for the image output device for the output of the generated at least one first tangential slice image; and transmitting the control commands to the image output device.

15. A computer readable medium including a computer program product, the computer program product comprising instructions, which when executed on a computer device, causes the computer device to perform functions for outputting of slice images, obtained from volume data, of a tissue region comprising at least one hollow organ section, the functions including:

providing at least one profile line section of the hollow organ section with a first and second end point;

identifying one auxiliary plane including the end points of the at least one profile line section, wherein a rotational angle of the auxiliary plane about a rotational axis running through the end points of the at least one profile line section is selected using an optimization method such that a defined distance measure between the auxiliary plane and the at least one profile line section is minimized;

determining a maximum distance point on the at least one profile line section, the determined maximum distance point having a relatively greatest distance from the auxiliary plane;

analyzing whether a distance of the maximum distance point from the auxiliary plane is less than a threshold, and dividing the at least one profile line section into two profile line sections at the maximum distance point upon the distance of the maximum distance point from the auxiliary plane not lying below the threshold;

recursive continuing the identifying, the determining and the analyzing with the two profile line sections until an auxiliary plane is found for each at least one profile line section, the distance of the auxiliary plane from a maximum distance point of a respective at least one profile line section lying below the threshold; and respectively assigning first tangential slice planes to observation points situated on the respectively associated at least one profile line section on based on the obtained auxiliary planes.

\* \* \* \* \*